(12) United States Patent
Hossain et al.

(10) Patent No.: US 8,616,498 B2
(45) Date of Patent: Dec. 31, 2013

(54) AIRCRAFT INSULATION SYSTEMS AND METHODS

(75) Inventors: Zahid Hossain, Renton, WA (US); Khashayar Borumand, Kirkland, WA (US); Neha Sharma, Everett, WA (US); Keith Couilliard, Renton, WA (US); Gaurav Kumar, Seattle, WA (US); Sean M. Finerty, Bothell, WA (US); Sara Lynn Walter, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 716 days.

(21) Appl. No.: 12/415,040

(22) Filed: Mar. 31, 2009

(65) Prior Publication Data

US 2010/0243807 A1 Sep. 30, 2010

(51) Int. Cl.
*B64C 1/10* (2006.01)
*B64D 7/00* (2006.01)

(52) U.S. Cl.
USPC ........................................ 244/121; 244/129.2

(58) Field of Classification Search
USPC ............................ 244/121, 119, 123.5, 129.2
See application file for complete search history.

(56) References Cited

U.S. PATENT DOCUMENTS

| | | | |
|---|---|---|---|
| 5,624,726 A * | 4/1997 | Sanocki et al. | 428/74 |
| 5,759,659 A * | 6/1998 | Sanocki et al. | 428/74 |
| 6,358,591 B1 | 3/2002 | Smith | |
| 6,551,951 B1 * | 4/2003 | Fay et al. | 442/82 |
| 6,860,082 B1 * | 3/2005 | Yamamoto et al. | 52/794.1 |
| 7,083,147 B2 | 8/2006 | Movsesian et al. | |
| 7,767,597 B2 * | 8/2010 | Garvey | 442/2 |
| 2005/0211839 A1 * | 9/2005 | Movsesian et al. | 244/119 |
| 2008/0166937 A1 | 7/2008 | Garvey | |
| 2010/0209679 A1 * | 8/2010 | Tompkins | 428/201 |

FOREIGN PATENT DOCUMENTS

EP 1134479 A2 9/2001

OTHER PUBLICATIONS

U.S. Department of Transportation, Federal Aviation Administration, FAA Advisory Circular, AC No. 25.856 "Installation of Thermal/Acoustic Insulation for Burnthrough Protection," Jul. 29, 2008.
Title 14: Aeronautics and Space, Part 25—Airworthiness Standards: Transport Category Airplanes, Subpart D—Design and Construction, Sec. 25.856 Thermal/Acoustic insulation materials.
FAA proposed rule of fire penetration resistance of thermal acoustic insulation installed on transport category airplanes, 17 CFR 121; Part VII—Test Method to Determine the Burnthrough Resistance of Thermal/Acoustic Insulation Materials.
Extended European Search Report of the European Patent Office, Dated Mar. 27, 2013, for European Application No. 10250705.0-1754/2236412, Applicant the Boeing Company, 7 pages.

* cited by examiner

*Primary Examiner* — Philip J Bonzell

(57) ABSTRACT

In one of the embodiments of the disclosure, there is provided an aircraft insulation system and method for providing fire penetration resistance and/or thermal and acoustic protection. The aircraft insulation system comprises one or more insulation blankets, each having an inboard side and an outboard side. The aircraft insulation system further comprises a fire penetration resistant cover material having a heat seal adhesive, wherein the fire penetration resistant cover material covers the outboard side of the one or more insulation blankets. The aircraft insulation system further comprises an insulation cover film having a heat seal adhesive, wherein the insulation cover film covers the inboard side of the one or more insulation blankets. The aircraft insulation system further comprises a thermal heat seal that joins the fire penetration resistant cover material and the insulation cover film together to form a continuous insulation blanket assembly.

24 Claims, 9 Drawing Sheets

AIRCRAFT INSULATION SYSTEMS AND METHODS

BACKGROUND

1) Field of the Disclosure

The disclosure relates to aircraft insulation systems. In particular, the disclosure relates to aircraft insulation systems and methods having heat seal seams and/or fire penetration resistant coverings.

2) Description of Related Art

Many aircraft employ insulation blankets to moderate the interior temperature of the aircraft and to provide noise insulation. Such insulation blankets typically provide thermal and acoustic insulation and are placed into the air space or cavity between the aircraft fuselage skin panels and the aircraft interior panels. It is also desirable for such insulation blankets to incorporate fire resistant materials to protect passengers of an aircraft in the event of a fire such as a ground fuel fire or post-crash fire. The longer it takes for the fire to penetrate the aircraft fuselage, the more time aircraft passengers may have to evacuate the aircraft before being overcome by smoke or heat from the fire. Thus, an extended period of burnthrough protection for insulation blankets is desirable.

The Federal Aviation Administration (FAA) has promulgated regulations, contained in part, in 14 C.F.R. Section 25.856 (a) & (b), and part VII of Appendix F to 14 C.F.R. Section 25, requiring thermal and acoustic insulation blanket systems in commercial aircraft to provide improved burnthrough protection and flame propagation resistance in certain areas of airplanes. For example, FAA regulation 25.856 (b) applies to thermal/acoustic insulation installed in the "lower half of the airplane fuselage", which means the area below a horizontal line that bisects the cross section of the fuselage as measured with the airplane in a normal attitude on the ground. In addition, the FAA has issued Advisory Circular AC Number 25.856-2A, to provide guidance for a test method to determine burnthrough resistance of thermal and acoustic insulation materials installed in the lower half of the fuselage in transport category aircraft. The FAA 14 C.F.R. Section 25.856(b), in part, requires that a fire penetration resistant material in a thermal and acoustic insulation blanket system withstand a post-crash fuel fed fire of 1900 degrees Fahrenheit from penetrating into the passenger cabin or cargo compartment of an aircraft for at least four minutes (also referred to as "the Burnthrough Rule").

Known thermal and acoustic insulation blanket systems typically include thermal and acoustic insulation blankets encapsulated within a film covering or bag. FAA burnthrough regulations primarily affect the contents of the insulation systems bags, and the FAA flame propagation resistance regulations primarily affect the film coverings used to fabricate the bags. The film coverings typically are used as a layer or covering, for example, layered between, laid over, or laid behind layers of thermal and acoustic insulation material, or as a covering or bag for partially or totally encapsulating one or more layers of thermal and acoustic insulation material.

Insulation blankets incorporating fire resistant materials are known. Such known insulation blankets may consist of one or multiple layers of fiberglass batting encapsulated by two layers of polymer film. The inboard and the outboard films may be heat sealed on the periphery to create a water tight seal. Multiple insulation blankets may then be taped together to create an assembly. However, the materials on such known insulation blanket assemblies, as well as the tape design, do not comply with the FAA regulation. In addition, the use of tape with known insulation blankets on an airplane can increase the overall weight of the airplane.

Accordingly, there is a need for an aircraft insulation system and method having heat seal seams and/or fire penetration resistant coverings that provides advantages over known systems and methods.

SUMMARY

This need for an aircraft insulation system and method having heat seal seams and/or fire penetration resistant coverings is satisfied. None of the known systems and methods provide all of the numerous advantages discussed herein. Unlike known systems and methods, embodiments of the system and method of the disclosure may provide one or more of the following advantages: provides an aircraft insulation system and method having a fire penetration resistant covering that allows for bagging of fiberglass batting without the usage of tape, thus reducing the total weight of each part; provides an aircraft insulation system and method having a fire penetration resistant covering that is continuous throughout the assembly to create a fire penetration resistant cover or barrier; provides an aircraft insulation system and method having a fire penetration resistant covering that is in compliance with FAA regulations contained in part in 14 C.F.R. Section 25.856 (a) & (b) and part VII of Appendix F to 14 C.F.R. Section 25; provides an aircraft insulation system and method having a fire penetration resistant covering that allows for the usage of a fire penetration resistant cover material that can be used as a standard insulation cover film covering that is heat sealable, as well as meets the FAA requirement to withstand a post-crash fuel fed fire of 1900 degrees Fahrenheit from penetrating into the passenger cabin or cargo compartment of an aircraft for at least four minutes; provides an aircraft insulation system and method having a fire penetration resistant covering that saves airplane weight and has a simplified design; provides an aircraft insulation system and method having a fire penetration resistant covering that is continuous and allows fabrication of a two-piece insulation blanket as a single piece with no joints and no tape needed to hold the two pieces together; and provides an aircraft insulation system and method for providing thermal and acoustic protection and having insulation covering that is continuous and allows fabrication of a two-piece insulation blanket as a single piece with heat seal seams and with no joints and no tape needed to hold the two pieces together.

In one of the advantageous embodiments of the disclosure, there is provided an aircraft insulation system for providing fire penetration resistance and thermal protection. The aircraft insulation system comprises one or more insulation blankets, each having an inboard side and an outboard side. The aircraft insulation system further comprises a fire penetration resistant cover material having a heat seal adhesive, wherein the fire penetration resistant cover material covers the outboard side of the one or more insulation blankets. The aircraft insulation system further comprises an insulation cover film having a heat seal adhesive, wherein the insulation cover film covers the inboard side of the one or more insulation blankets. The aircraft insulation system further comprises a thermal heat seal that joins the fire penetration resistant cover material and the insulation cover film together to form a continuous insulation blanket assembly.

In another one of the advantageous embodiments of the disclosure, there is provided an aircraft insulation system for providing fire penetration resistance and thermal protection. The aircraft insulation system comprises one or more insulation blankets, each having an inboard side and an outboard side. The aircraft insulation system further comprises a fire penetration resistant cover material having a heat seal adhesive, wherein the fire penetration resistant cover material covers the outboard side of the one or more insulation blankets and also covers the inboard side of the one or more insulation blankets. The aircraft insulation system further comprises a thermal heat seal that joins the fire penetration resistant cover material on the outboard side and the fire penetration resistant cover material on the inboard side together to form a continuous insulation blanket assembly.

In another one of the advantageous embodiments of the disclosure, there is provided an aircraft insulation system for providing thermal and acoustic protection. The aircraft insulation system comprises one or more insulation blankets, each having an inboard side and an outboard side. The aircraft insulation system further comprises an insulation cover film having a heat seal adhesive, wherein the insulation cover film covers the outboard side of the one or more insulation blankets and also covers the inboard side of the one or more insulation blankets. The aircraft insulation system further comprises a thermal heat seal or an ultrasonic heat seal that joins the insulation cover film on the outboard side and the insulation cover film on the inboard side together to form a continuous insulation blanket assembly.

In another one of the advantageous embodiments of the disclosure, there is provided a method of making a continuous insulation blanket assembly. The method comprises applying a heat seal adhesive to an inboard side of a fire penetration resistant cover material, applying a heat seal adhesive to an inboard side of an insulation cover film, and providing one or more insulation blankets, each having an inboard side and an outboard side. The method further comprises covering the outboard side of the one or more insulation blankets with the fire penetration resistant cover material having the heat seal adhesive, covering the inboard side of the one or more insulation blankets with the insulation cover film having the heat seal adhesive, forming an insulation blanket assembly, and heat sealing the insulation blanket assembly via thermal energy to form a continuous insulation blanket assembly.

In another one of the advantageous embodiments of the disclosure, there is provided a method of making a continuous insulation blanket assembly. The method comprises applying a heat seal adhesive to an inboard side of a fire penetration resistant cover material, and providing one or more insulation blankets, each having an inboard side and an outboard side. The method further comprises covering the outboard side of the one or more insulation blankets with the fire penetration resistant cover material having the heat seal adhesive, covering the inboard side of the one or more insulation blankets with the fire penetration resistant cover material having the heat seal adhesive, and heat sealing the insulation blanket assembly via thermal energy.

In another one of the advantageous embodiments of the disclosure, there is provided a method of making a continuous insulation blanket assembly. The method comprises applying a heat seal adhesive to an inboard side of an insulation cover film and providing one or more insulation blankets, each having an inboard side and an outboard side. The method further comprises covering the outboard side of the one or more insulation blankets with the insulation cover film having the heat seal adhesive, covering the inboard side of the one or more insulation blankets with the insulation cover film having the heat seal adhesive, and heat sealing the insulation blanket assembly via thermal or ultrasonic energy.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

The disclosure provides for an aircraft insulation system and method having a fire penetration resistant covering for use in aircraft such as commercial aircraft. However, the system and method may also be used in other suitable transport category airplanes, as well as other transport vehicles that may require thermal, acoustic and high temperature insulation systems, such as trains, ships, buses and other suitable transport vehicles. Buildings, houses, and other structures may also utilize the insulation systems and methods of the disclosure. Accordingly, one of ordinary skill in the art will recognize and appreciate that the system and method of the disclosure can be used in any number of applications involving an aircraft insulation system and method having a fire penetration resistant covering.

Figure 1:
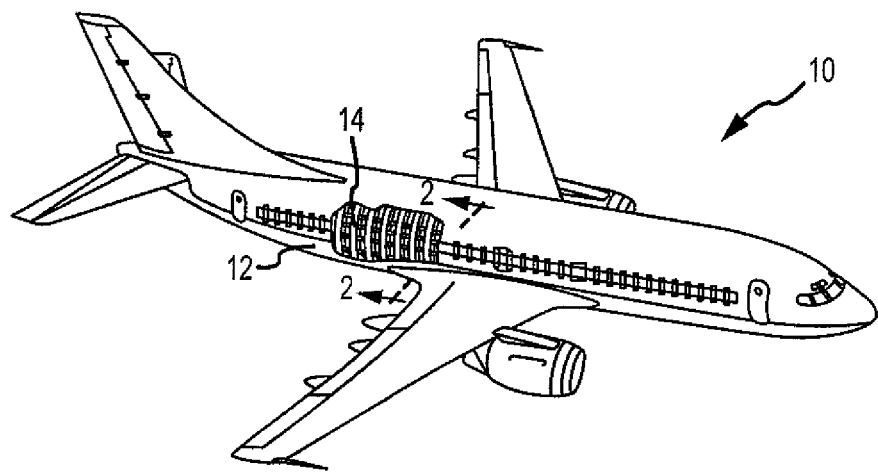
FIG. 1 is an illustration of a perspective view of a prior art aircraft incorporating one of the embodiments of the disclosure of an aircraft insulation system.
Figure 2:
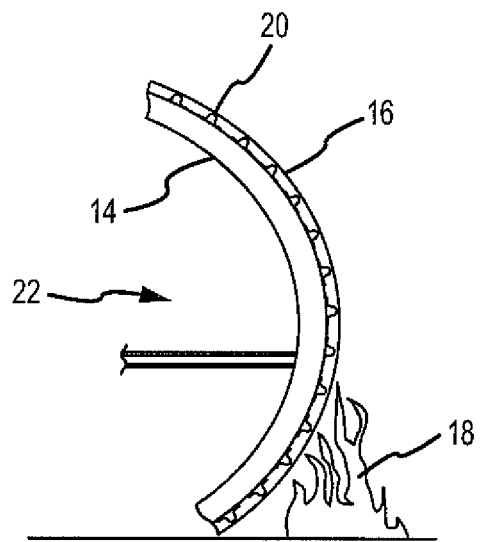
FIG. 2 is an illustration of an enlarged cross-sectional view of the prior art aircraft fuselage taken along lines 2-2 of FIG. 1, showing flames from a ground fuel fire encroaching upon the aircraft fuselage.

Referring more particularly to the drawings, FIG. 1 is an illustration of a perspective view of a prior art aircraft 10 incorporating one of the embodiments of the disclosure of an aircraft insulation system 20 (see FIG. 2) having a fire penetration resistant cover material 32 (see FIG. 4) for use in an aircraft fuselage 12 between parallel frame members or ribs 14. FIG. 2 is an illustration of an enlarged cross-sectional view of the prior art aircraft fuselage 12 between parallel frame members or ribs 14 taken along lines 2-2 of FIG. 1, and showing flames 18 from a ground fuel fire encroaching upon aircraft skin 16. Aircraft 10 equipped with aircraft insulation system 20, or equipped with another embodiment of the aircraft insulation system, as discussed in further detail below, better prevents flame penetration from a ground fuel fire into an interior 22 of the aircraft 10 compared to known aircraft insulation system 200 (see FIG. 3) and known aircraft insulation system 300 (see FIG. 7).

Figure 3:
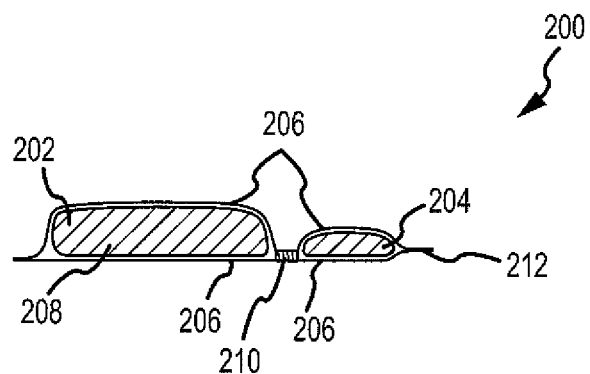
FIG. 3 is an illustration of a prior art aircraft insulation system having tape.

FIG. 3 is an illustration of a prior art aircraft insulation system 200. The aircraft insulation system 200 comprises insulation blankets 202, 204 having an insulation cover film 206 around the insulation blankets 202, 204. The insulation blankets 202, 204 may be comprised of fiberglass batting 208. For example, the prior art aircraft insulation system may comprise one or multiple layers of fiberglass batting encapsulated by two layers of insulation cover film such as polymer film. The insulation blankets 202, 204 are typically fabricated as separate pieces and then are joined together with tape 210 and may be peripherally sealed with an ultrasonic heat seal 212. The tape 210 does not comply with the FAA regulation discussed above.

Figure 7:
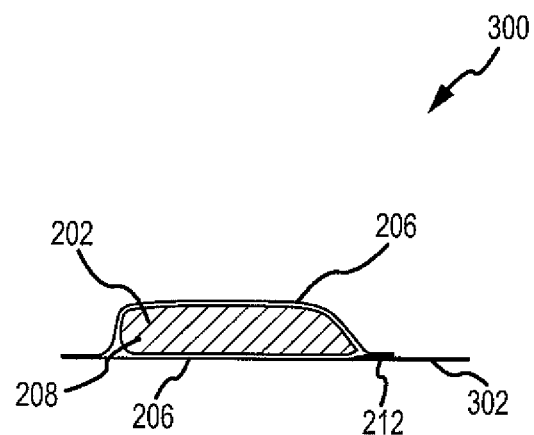
FIG. 7 is an illustration of a prior art aircraft insulation system with a tab of standard cover film.

FIG. 7 is an illustration of a prior art aircraft insulation system 300. The aircraft insulation system 300 comprises insulation blanket 202 that may be comprised of fiberglass batting 208. The aircraft insulation system 300 further comprises insulation cover film 206 and a tab 302 of insulation cover film 206 that is sealed with an ultrasonic heat seal 212.

Figure 4:
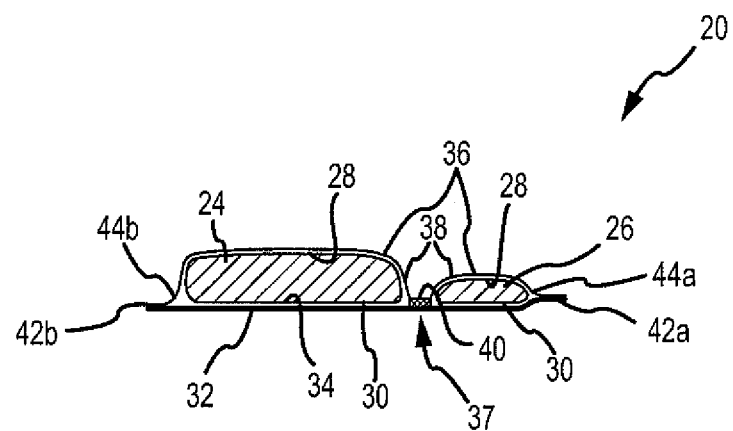
FIG. 4 is an illustration of one of the embodiments of the aircraft insulation systems of the disclosure.

FIG. 4 shows one of the embodiments of an aircraft insulation system 20 for providing fire penetration resistance and thermal protection. The aircraft insulation system 20 comprises one or more insulation blankets 24, 26, each having an inboard side 28 and an outboard side 30. The one or more insulation blankets 24, 26 may comprise one or more of bay blankets 24 and/or cap blankets 26 comprised of fiberglass batting or another suitable material. The bay blanket 24 may be constructed with multiple layers of fiberglass, and the cap blanket 26 may be made with a single layer of fiberglass. The bay blanket 24 is typically positioned adjacent to the fuselage, and the cap blanket 26 is typically positioned over the frame and intercostal. The aircraft insulation system 20 further comprises a fire penetration resistant cover material 32 having a heat seal adhesive 34. The fire penetration resistant cover material 32 covers the outboard side 30 of the one or more insulation blankets 24, 26. The outboard side or outer side is the side facing away from the fiberglass batting. The aircraft insulation system 20 further comprises an insulation cover film 36 having a heat seal adhesive 38. The insulation cover film 36 covers the inboard side 28 of the one or more insulation blankets 24, 26. The inboard side or inner side is the side facing toward the fiberglass batting. The aircraft insulation system 20 further comprises a thermal heat seal 40 that joins the fire penetration resistant cover material 32 and the insulation cover film 36 together to form a continuous insulation blanket assembly 37. The insulation cover film 36 may comprise thin polymer films such as polyetheretherketone (PEEK), polyetherteraphthalate (PET), polyvinylfluoride (PVF), polyetherketoneketone (PEKK), polyimide (PI), polypropylene (PP), or another suitable polymer material. Various densities and thicknesses of fiberglass batting may be encapsulated with the insulation cover film 36 such as thin films to form the insulation blankets. The aircraft insulation system 20 may further comprise ultrasonic heat seal 42a at a peripheral end 44a of the cap blanket 26. The aircraft insulation system 20 may further comprise ultrasonic heat seal 42b at a peripheral end 44b of the bay blanket 24. The peripheral ends 44a, 44b may be sealed with the ultrasonic heat seals 44a, 44b, a thermal heat seal, or another suitable seal. Also, multiple parts of an assembly such as the bay blanket 24 and the cap blanket 26 and/or a return blanket 76 (see FIG. 10) may be fabricated separately and then joined together to make an assembly. The fire penetration resistant cover material 32 is preferably continuous throughout the insulation blanket assembly 37 to create a fire barrier. The fire penetration resistant cover material 32 may be used as insulation covering and may heat seal to itself or to an existing or newly developed insulation cover film. The fire penetration resistant cover material 32 may replace the outboard insulation cover film or replace both the inboard and outboard insulation cover film of an insulation blanket assembly thus providing a continuous fire barrier and at the same time passing the FAA burnthrough testing. The design allows use and installation of aircraft insulation assemblies on the airplane without any discontinuity of the fire penetration resistant cover material. Because of the heat seal properties, the insulation design of the aircraft insulation system allows combining two or more separate parts within an assembly and sealing the parts together. In addition, the design with the fire penetration resistant cover material 32 creates a continuous insulation blanket assembly that meets and complies with the FAA regulations discussed above. The insulation blanket system and method allows the fire penetration resistant cover material 32 to be continuous between the multiple parts without any breakage creating a fire penetration barrier and at the same time providing separation between the thinner and the thicker blankets. Because of the unique design feature of the fire penetration resistant cover material 32, it can be used in a similar manner for assemblies with one or multiple parts made of single as well as multiple layers of fiberglass batting. The insulation blanket system and method allows an insulation assembly with one part and also combines multiple parts of an assembly without severely changing the shape and geometry of the existing assembly configuration and at the same time meets the stringent flame penetration requirements. Both the outboard fire penetration resistant cover material and insulation cover film covering and the inboard insulation cover film covering are preferably continuous between parts, such as the bay blanket and the cap blanket, with a thermal heat seal 40 seam line in between. Preferably, the aircraft insulation system 20 applies to thermal/acoustic insulation installed in the lower half of the airplane fuselage, that is, the area below a horizontal line that bisects the cross section of the fuselage as measured with the airplane in a normal attitude on the ground.

Figure 11:
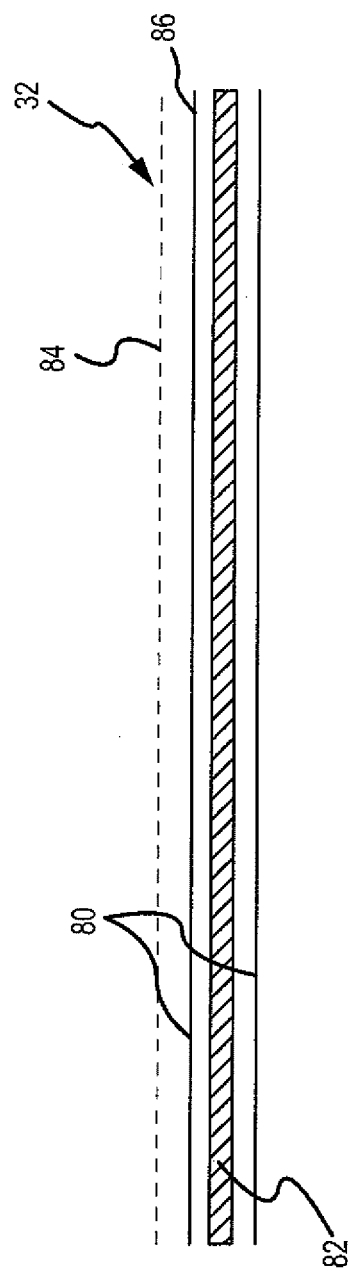
FIG. 11 is an illustration of one of the embodiments of a fire penetration resistant cover material of the disclosure.

FIG. 11 is an illustration of one of the embodiments of a fire penetration resistant cover material 32 of the disclosure. In one of the embodiments, the fire penetration resistant cover material 32 may comprise a ceramic based material 82 as the core material laminated between two polymer film layers 80. The ceramic based material 82 may comprise a high temperature paper having ceramic fibers therein. The polymer film layer 80 may comprise thin polymer films such as polyetheretherketone (PEEK), polyetherteraphthalate (PET), polyvinylfluoride (PVF), polyetherketoneketone (PEKK), polyimide (PI), polypropylene (PP), or another suitable polymer material. A heat seal adhesive 84 may be applied to a surface 86 of one of the polymer film layers 80, so that the finished fire penetration resistant cover material 32 may be bonded or heat sealed to a similar or different polymer film by an ultrasonic or thermal impulse heat seal machine or another suitable heat sealing process. The heat seal adhesive 84 may comprise suitable heat seal adhesives. The fire penetration resistant cover material 32 may be obtained from high temperature film/paper suppliers.

Figure 5:
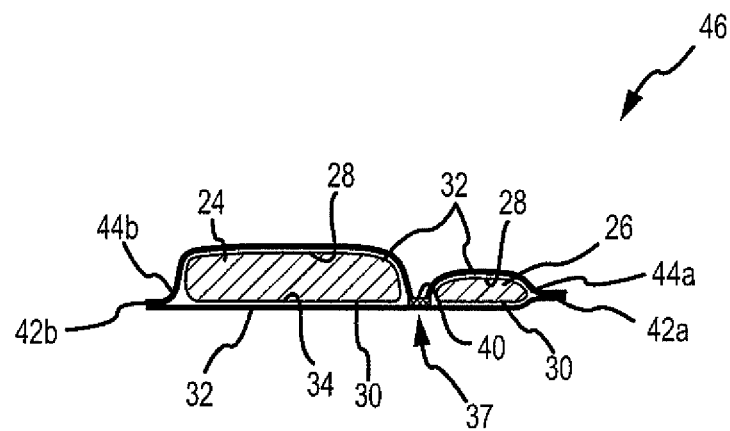
FIG. 5 is an illustration of another one of the embodiments of the aircraft insulation systems of the disclosure.

FIG. 5 shows another one of the embodiments of an aircraft insulation system 46 for providing fire penetration resistance and thermal protection. The aircraft insulation system 46 comprises one or more insulation blankets 24, 26, each having an inboard side 28 and an outboard side 30. The aircraft insulation system 46 further comprises a fire penetration resistant cover material 32 having a heat seal adhesive 34. The fire penetration resistant cover material 32 covers the outboard side 30 of the one or more insulation blankets 24, 26 and also covers the inboard side 28 of the one or more insulation blankets 24, 26. The aircraft insulation system 46 further comprises a thermal heat seal 40 that joins the fire penetration resistant cover material 32 on the outboard side 30 and the fire penetration resistant cover material 32 on the inboard side 28 together to form a continuous insulation blanket assembly 37. The fire penetration resistant cover material 32 may comprise a high temperature paper having ceramic based material. The one or more insulation blankets 24, 26 may comprise one or more of bay blankets 24 and cap blankets 26 comprised of fiberglass batting or another suitable material. The aircraft insulation system 46 may further comprise ultrasonic heat seal 42a at a peripheral end 44a of the cap blanket 26. The aircraft insulation system 46 may further comprise ultrasonic heat seal 42b at a peripheral end 44b of the bay blanket 24. The peripheral ends 44a, 44b may be sealed with the ultrasonic heat seals 44a, 44b, a thermal heat seal, or another suitable seal. Preferably, the aircraft insulation system 46 applies to thermal/acoustic insulation installed in the lower half of the airplane fuselage, that is, the area below a horizontal line that bisects the cross section of the fuselage as measured with the airplane in a normal attitude on the ground.

Figure 6:
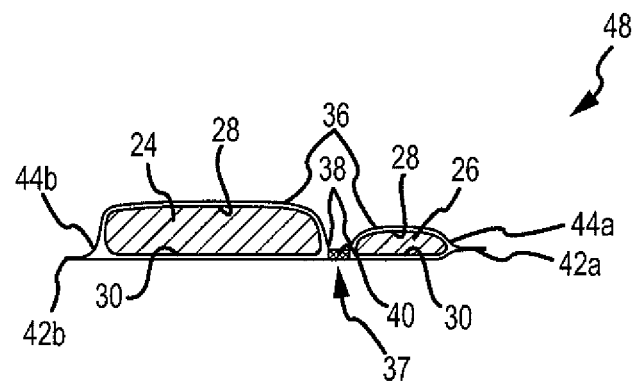
FIG. 6 is an illustration of another one of the embodiments of the aircraft insulation systems of the disclosure.

FIG. 6 shows another one of the embodiments of an aircraft insulation system 48 for providing fire penetration resistance and thermal protection. The aircraft insulation system 48 comprises one or more insulation blankets 24, 26, each having an inboard side 28 and an outboard side 30. The aircraft insulation system 48 further comprises an insulation cover film 36 having a heat seal adhesive 38. The insulation cover film 36 covers the outboard side 30 of the one or more insulation blankets 24, 26 and also covers the inboard side 28 of the one or more insulation blankets 24, 26. The aircraft insulation system 48 further comprises a thermal heat seal 40 or ultrasonic heat seal that joins the insulation cover film 36 on the outboard side 30 and the insulation cover film 36 on the inboard side 28 together to form a continuous insulation blanket assembly 37. The insulation cover film 36 may comprise thin polymer films such as polyetheretherketone (PEEK), polyetherteraphthalate (PET), polyvinylfluoride (PVF), polyetherketoneketone (PEKK), polyimide (PI), polypropylene (PP), or another suitable polymer material. The one or more insulation blankets 24, 26 may comprise one or more of bay blankets 24 and cap blankets 26 comprised of fiberglass batting or another suitable material. The aircraft insulation system 48 may further comprise ultrasonic heat seal 42a at a peripheral end 44a of the cap blanket 26. The aircraft insulation system 46 may further comprise ultrasonic heat seal 42b at a peripheral end 44b of the bay blanket 24. The peripheral ends 44a, 44b may be sealed with the ultrasonic heat seals 44a, 44b, a thermal heat seal, or another suitable seal.

Figure 8:
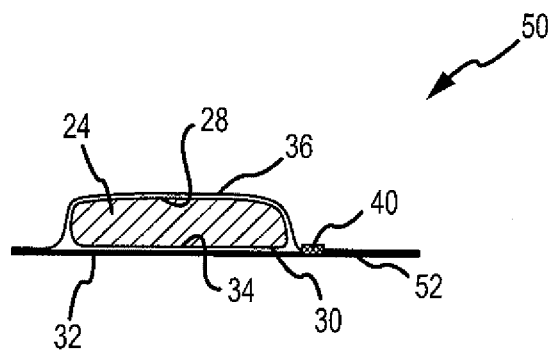
FIG. 8 is an illustration of another one of the embodiments of the aircraft insulation systems of the disclosure having a tab.

FIG. 8 is an illustration of another one of the embodiments of an aircraft insulation system 50. The aircraft insulation system 50 comprises an insulation blanket 24 having an inboard side 28 and an outboard side 30. The aircraft insulation system 50 further comprises insulation cover film 36 covering the inboard side 28 of the insulation blanket 24 and fire penetration resistant cover material 32 covering the outboard side 30 of the insulation blanket 24. The fire penetration resistant cover material 32 may have a heat seal adhesive 34. The aircraft insulation system 50 further comprises a thermal heat seal 40 that joins the insulation cover film 36 on the inboard side 28 together with the fire penetration resistant cover material 32 on the outboard side 30. The aircraft insulation system 50 further comprises an extended tab 52 of fire penetration resistant cover material 32.

Figure 12:
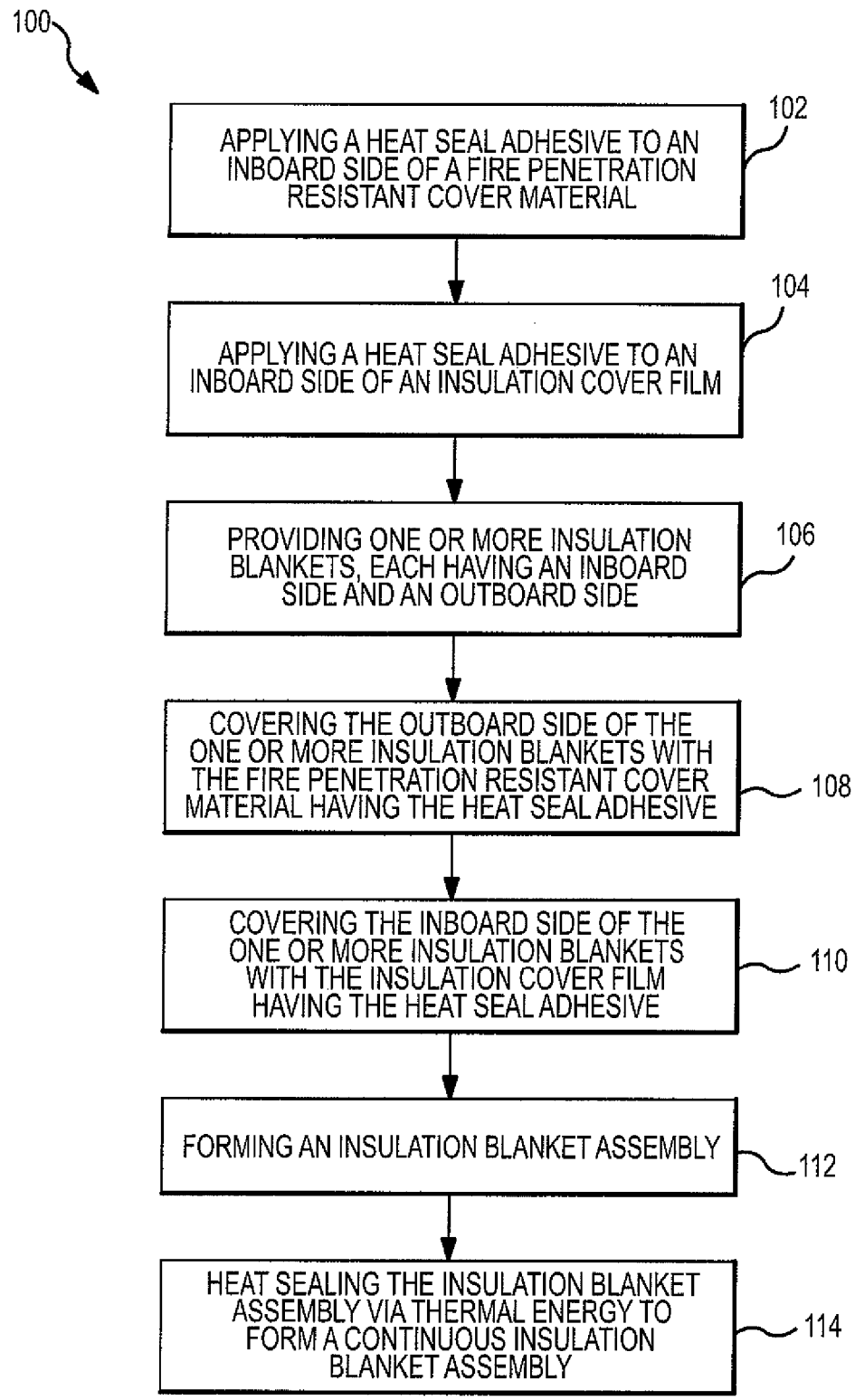
FIG. 12 is an illustration of a flow diagram of one of the embodiments of the aircraft insulation methods of the disclosure.

FIG. 12 shows an embodiment of a method 100 of making a continuous insulation blanket assembly 37 (see FIG. 4). The method 100 comprises step 102 of applying a heat seal adhesive 34 to an inboard side of a fire penetration resistant cover material 32. The method 100 further comprises step 104 of applying a heat seal adhesive 38 to an inboard side of an insulation cover film 36. The method 100 further comprises step 106 of providing one or more insulation blankets 24, 26, each having an inboard side 28 and an outboard side 30. The method 100 further comprises step 108 of covering the outboard side 30 of the one or more insulation blankets 24, 26 with the fire penetration resistant cover material 32 having the heat seal adhesive 34. The method 100 further comprises step 110 of covering the inboard side 28 of the one or more insulation blankets 24, 26 with the insulation cover film 36 having the heat seal adhesive 38. The method 100 further comprises step 112 of forming an insulation blanket assembly. The method 100 further comprises step 114 of heat sealing the insulation blanket assembly via thermal energy to form a continuous insulation blanket assembly. The heat seal adhesive 34 applied to the fire penetration resistant cover material 32 and the heat seal adhesive 38 applied to the insulation cover material 36 are preferably compatible adhesives. The fire penetration resistant cover material 32 may comprise a burnthrough paper having ceramic fiber. The insulation cover film 36 may comprise thin polymer films such as polyetheretherketone (PEEK), polyetherteraphthalate (PET), polyvinylfluoride (PVF), polyetherketoneketone (PEKK), polyimide (PI), polypropylene (PP), or another suitable polymer material. The one or more insulation blankets 24, 26 may comprise one or more of bay blankets 24 and cap blankets 26 comprised of fiberglass batting or another suitable material. The heat sealing may be conducted via ultrasonic heat sealing. The continuous insulation blanket assembly may be used in an aircraft fuselage.

Figure 13:
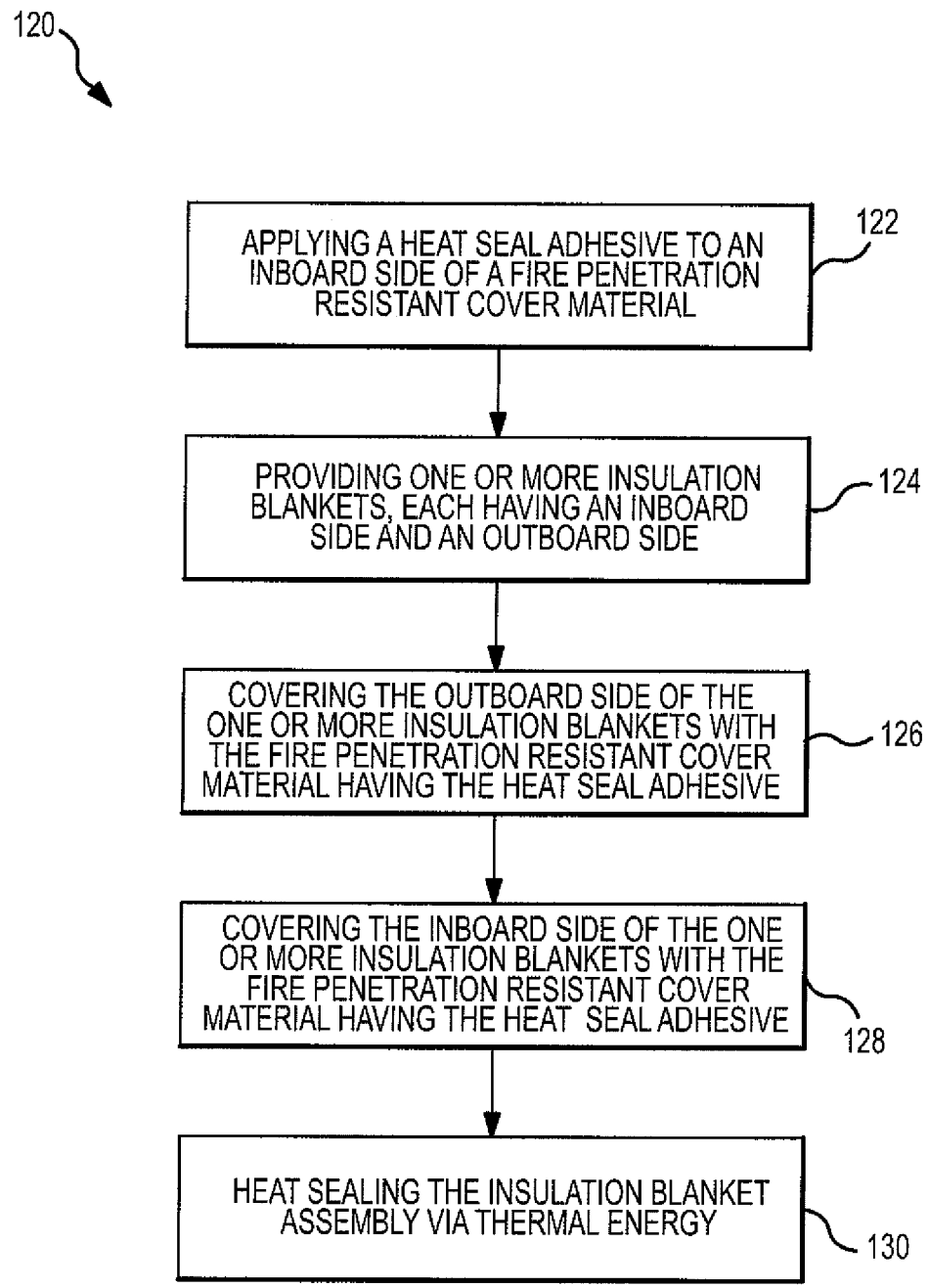
FIG. 13 is an illustration of a flow diagram of another one of the embodiments of the aircraft insulation methods of the disclosure; and, FIG. 14 is an illustration of a flow diagram of another one of the embodiments of the aircraft insulation methods of the disclosure.

FIG. 13 shows another embodiment of a method 120 of making a continuous insulation blanket assembly 37 (see FIG. 5). The method 120 comprises step 122 of applying a heat seal adhesive 34 to an inboard side of a fire penetration resistant cover material 32. The method 120 further comprises step 124 of providing one or more insulation blankets 24, 26, each having an inboard side 28 and an outboard side 30. The method 120 further comprises step 126 of covering the outboard side 30 of the one or more insulation blankets 24, 26 with the fire penetration resistant cover material 32 having the heat seal adhesive 34. The method 120 further comprises step 128 of covering the inboard side 28 of the one or more insulation blankets 24, 26 with the fire penetration resistant cover material 32 having the heat seal adhesive 34. The method 120 further comprises step 130 of heat sealing the insulation blanket assembly via thermal energy. The fire penetration resistant cover material 32 may comprise a burnthrough paper having ceramic fiber. The one or more insulation blankets 24, 26 may comprise one or more of bay blankets 24 and cap blankets 26 comprised of fiberglass batting or another suitable material. The heat sealing may be conducted via ultrasonic heat sealing. The continuous insulation blanket assembly may be used in an aircraft fuselage.

Figure 14:
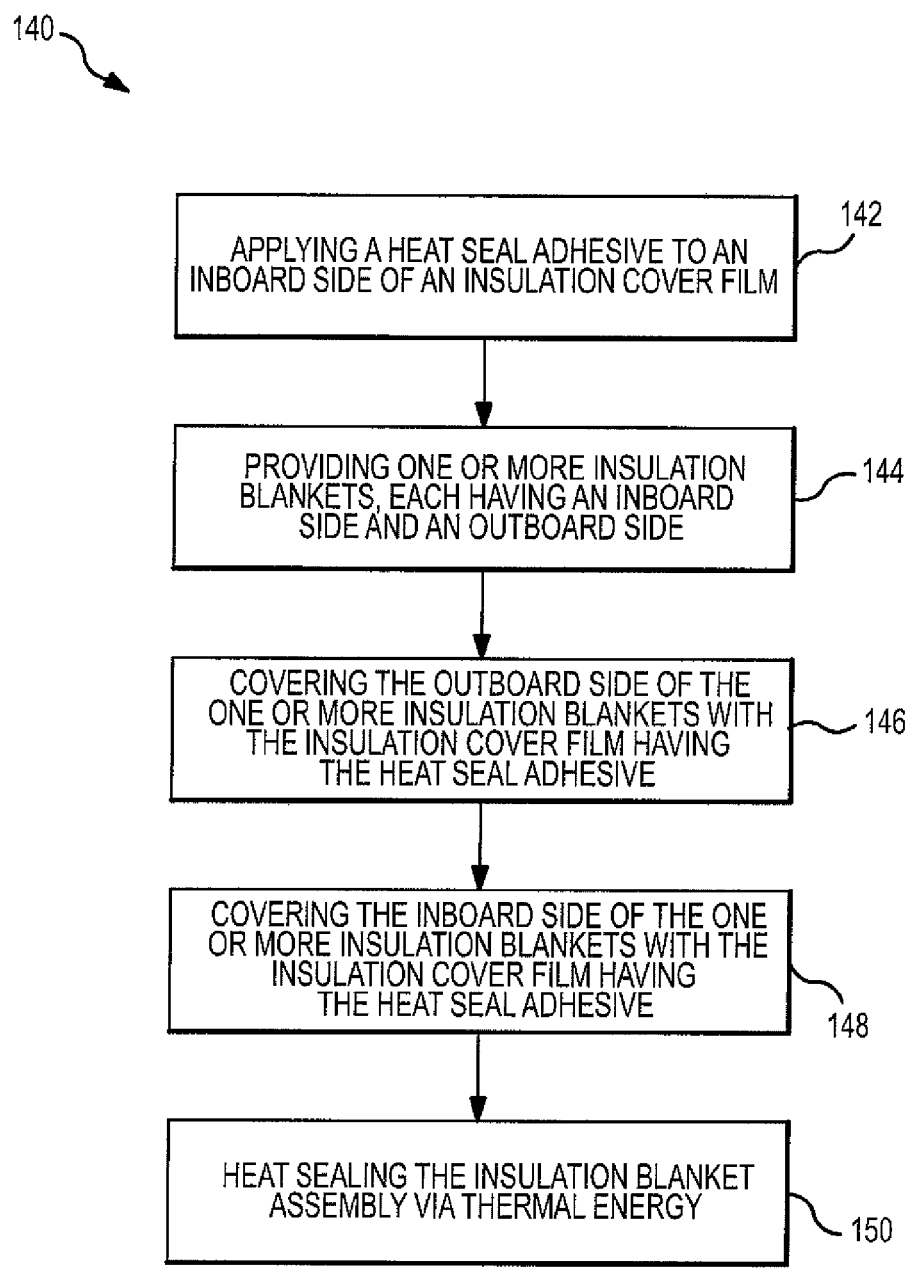

FIG. 14 shows another embodiment of a method 140 of making a continuous insulation blanket assembly 37 (see FIG. 6). The method 140 comprises step 142 of applying a heat seal adhesive 38 to an inboard side of an insulation cover film 36. The method further comprises step 144 of providing one or more insulation blankets 24, 26, each having an inboard side 28 and an outboard side 30. The method further comprises step 146 of covering the outboard side 30 of the one or more insulation blankets 24, 26 with the insulation cover film 36 having the heat seal adhesive 38. The method 140 further comprises step 148 of covering the inboard side 28 of the one or more insulation blankets 24, 26 with the insulation cover film 36 having the heat seal adhesive 38. The method 140 further comprises step 150 of heat sealing the insulation blanket assembly via thermal energy. The insulation cover film 36 may comprise thin polymer films such as polyetheretherketone (PEEK), polyetherteraphthalate (PET), polyvinylfluoride (PVF), polyetherketoneketone (PEKK), polyimide (PI), polypropylene (PP), or another suitable polymer material. The one or more insulation blankets 24, 26, may comprise one or more of bay blankets 24 and cap blankets 26 comprised of fiberglass batting or another suitable material. The heat sealing may be conducted via thermal heat sealing or the sealing may be conducted via ultrasonic heat sealing. The continuous insulation blanket assembly may be used in an aircraft fuselage.

Figure 9:
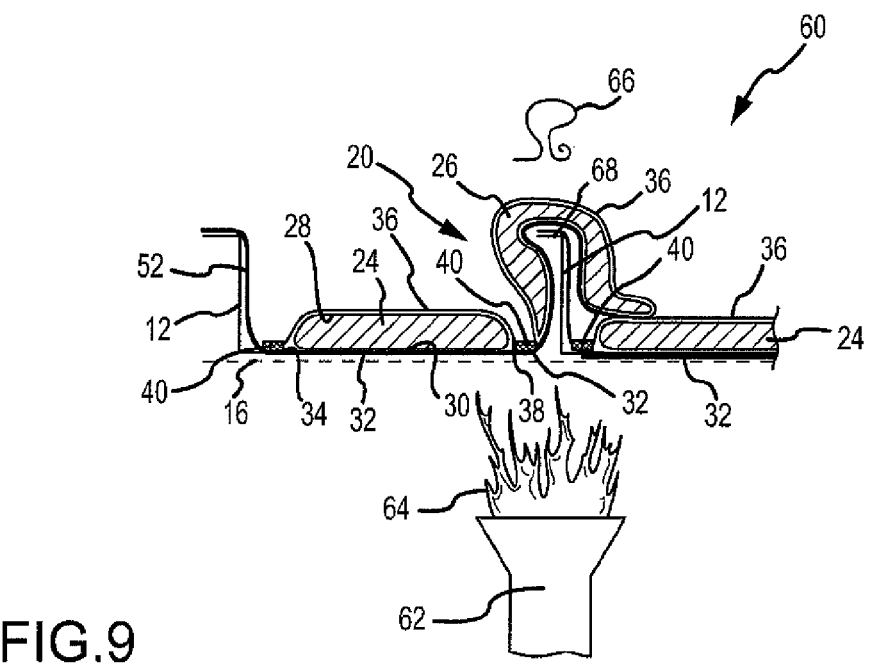
FIG. 9 is an illustration of an aircraft lower half installation of a sample assembly of one of the embodiments of an aircraft insulation system of the disclosure.
Figure 10:
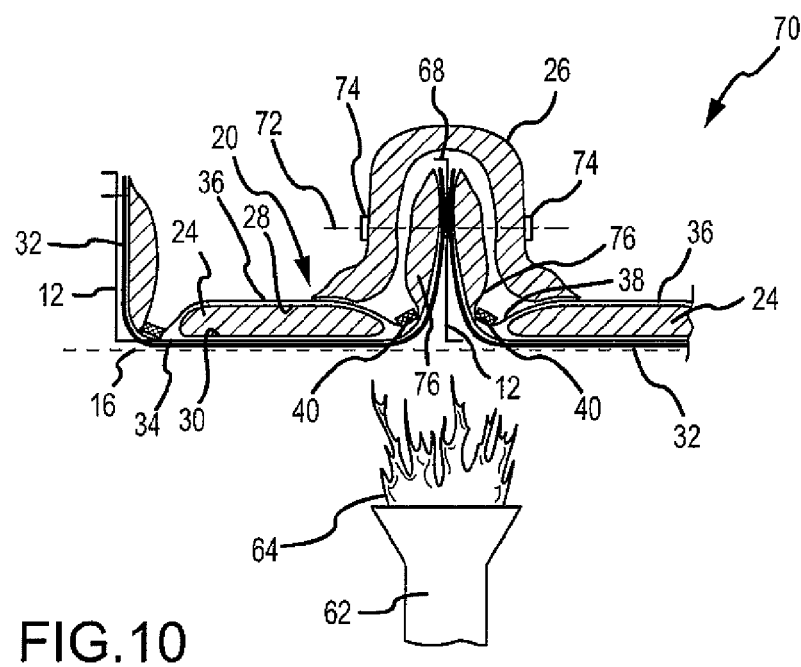
FIG. 10 is an illustration of another aircraft lower half installation of a sample assembly of one of the embodiments of an aircraft insulation system of the disclosure.

FIG. 9 is an illustration of an aircraft lower half installation of a sample assembly 60 of one of the embodiments of an aircraft insulation system 20 (see FIG. 4) of the disclosure. FIG. 10 is an illustration of another aircraft lower half installation of a sample assembly 70 of one of the embodiments of an aircraft insulation system 20 of the disclosure (see FIG. 4). Representative construction of test sample parts (32 inches by 36 inches) were built with a cap blanket 26 heat sealed to a bay blanket 24 and tested on a burnthrough test rig. The representative sample assemblies 60, 70 were installed on the test rig in a similar way an insulation assembly is installed on an airplane. The test rig consisted of three parallel frames 12 creating two bays 16. In FIG. 9, two pieces of insulation blanket 24 (bay blanket) and 26 (cap blanket) were installed on the bays 16 and wrapping the frames 12. As shown in FIG. 9, a clamp 66 was used to hold the cap blanket 26 over a top portion 68 of the frame 12. In FIG. 10, three pieces of insulation blanket 24 (bay blanket), 26 (cap blanket) and 76 (return blanket) were installed on the bays 16 and wrapping the frames 12. As shown in FIG. 10, a metal pin 72 and metal disks 74 were used to hold the cap blanket 26 over the top portion 68 of the frame 12 and were used to hold the cap blanket 26 and the return blankets 76 onto the frame 12. Fire penetration resistant cover material 32 was used to cover only the outboard side 30 or to cover both the outboard side 30 and the inboard side 28. If used as only the outboard side covering, then polymer base insulation film was used as inboard insulation cover film for both the cap blanket 26 and the bay blanket 24. The two samples were required for each testing. The fire penetration resistant cover material 32 was continuous throughout the bay blanket 24 and the cap blanket 26 test samples and thermally heat sealed via a thermal heat seal 40 to the inboard PEEK film or another flame barrier film at the join where the bay blanket part meets the cap blanket part. As tested, a burner 62 having a flame 64 of 1900 degree Fahrenheit temperature was applied to the representative construction of sample assemblies 60, 70 for four minutes to assess any penetration.

In FIG. 9, the insulation blankets 24, 26 each have an inboard side 28 and an outboard side 30 installed over the frame 12 near the bay 16. The insulation blankets 24, 26 each have fire penetration resistant cover material 32 on the outboard side 30 of the insulation blanket 24. Extended tab 52 extends from the penetration resistant cover material 32. The insulation blankets 24, 26 each have insulation cover film 36 on the inboard side 28. The blankets 24, 26 are joined together via thermal heat seal 40.

In FIG. 10, insulation blankets 24, 76 each have fire penetration resistant cover material 32 on the outboard side 30. The insulation blankets 24 have insulation cover film 36 on the inboard side 28. The bay blanket 24 and the return blanket 76 are joined together via thermal heat seal 40. There is a continuous fire penetration resistant cover material 32 between the bay blanket 24 and the return blanket 76. A separate cap blanket 26 may be installed over the fuselage and over the return blankets 76.

As shown in FIGS. 9-10, a layer of heat seal adhesive 34 may be applied to the inboard side (side facing the fiberglass batting) of the fire penetration resistant cover material 32. A layer of heat seal adhesive 38 may be applied to the inboard side (side facing the fiberglass batting) of the insulation cover film 36. The insulation blanket assembly may use fire penetration resistant cover material 32 as an outboard covering or both an outboard covering and an inboard covering. In the case where it is used as an outboard covering only, standard insulation cover film 36 can be used as the companion (inboard) covering. The heat seal adhesives 34, 38 on the companion coverings whether it is a fire penetration resistant cover material or standard insulation cover film are preferably compatible. Both thermal and ultrasonic heat seal methods can be used depending on the chemistry of the fire penetration resistant cover material. Temperature, pressure and speed of the heat sealing process to get the required bonding needs to be set up depending on the heat seal machine, for example, a heat seal machine such as a thermal heat sealer from Vertrod Corp., Joisten Kettenbaum, or similar, or for example, an ultrasonic heat sealer from Branson FS-90, Brother BU3-115s, Sonobond KS-86, or similar, may be used. A good heat seal bonding can be tested (T-Peel test) between two companion cover films utilizing a tension testing machine. A bonding strength of two pounds per inch width or higher in various directions is recommended for a preferably sealed aircraft insulation blanket assembly, for example, machine (parallel to wrap yarns), transverse (parallel to fill yarns) and bias (45 degrees to wrap and fill yarns). A preferable bonding width is a minimum of 0.125 inch.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting. Although specific terms are employed herein, they are used in a generic and descriptive sense only and not for purposes of limitation.

What is claimed is:

1. An aircraft insulation system for providing fire penetration resistance and thermal protection, the aircraft insulation system comprising:
   two or more insulation blankets comprising two or more of bay blankets and cap blankets wherein each bay blanket has a greater thickness than a thickness of each cap blanket, each insulation blanket having an inboard side and an outboard side;
   a continuous fire penetration resistant cover material having a heat seal adhesive, wherein the fire penetration resistant cover material covers the outboard side of the two or more insulation blankets and is continuous between the two or more insulation blankets without any breakage;
   a continuous insulation cover film having a heat seal adhesive, wherein the insulation cover film covers the inboard side of the two or more insulation blankets and is continuous between the two or more insulation blankets; and,
   a thermal heat seal that joins the fire penetration resistant cover material and the insulation cover film together to form a continuous insulation blanket assembly.

2. The aircraft insulation system of claim 1 wherein the continuous fire penetration resistant cover material comprises a burnthrough paper having ceramic fiber.

3. The aircraft insulation system of claim 1 wherein the continuous insulation cover film is selected from the group consisting of polyetheretherketone (PEEK), polyetherteraphthalate (PET), polyvinylfluoride (PVF), polyetherketoneketone (PEKK), polyimide (PI), and polypropylene (PP).

4. The aircraft insulation system of claim 1 wherein the two or more insulation blankets comprise two or more of bay blankets and cap blankets having fiberglass batting.

5. The aircraft insulation system of claim 1 wherein the heat seal adhesive of the continuous fire penetration resistant cover material and the heat seal adhesive of the continuous insulation cover material are compatible adhesives.

6. The aircraft insulation system of claim 1 wherein the continuous insulation blanket assembly is used in an aircraft fuselage.

7. An aircraft insulation system for providing fire penetration resistance and thermal protection, the aircraft insulation system comprising:
   two or more insulation blankets comprising two or more of bay blankets and cap blankets wherein each bay blanket has a greater thickness than a thickness of each cap blanket, each insulation blanket having an inboard side and an outboard side;
   a continuous fire penetration resistant cover material having a heat seal adhesive, wherein the fire penetration resistant cover material covers the outboard side of the two or more insulation blankets and is continuous between the two or more insulation blankets without any breakage;
   a continuous insulation cover film having a heat seal adhesive, wherein the insulation cover film covers the inboard side of the two or more insulation blankets and is continuous between the two or more insulation blankets;
   a thermal heat seal that joins the fire penetration resistant cover material and the insulation cover film together to form a continuous insulation blanket assembly; and,
   an ultrasonic heat seal or another thermal heat seal at a peripheral end of each of the two or more insulation blankets.

8. The aircraft insulation system of claim 7 wherein the continuous fire penetration resistant cover material comprises a burnthrough paper having ceramic fiber.

9. The aircraft insulation system of claim 7 wherein the continuous insulation cover film is selected from the group consisting of polyetheretherketone (PEEK), polyetherteraphthalate (PET), polyvinylfluoride (PVF), polyetherketoneketone (PEKK), polyimide (PI), and polypropylene (PP).

10. The aircraft insulation system of claim 7 wherein the two or more insulation blankets comprise two or more of bay blankets and cap blankets having fiberglass batting.

11. The aircraft insulation system of claim 7 wherein the heat seal adhesive of the continuous fire penetration resistant cover material and the heat seal adhesive of the continuous insulation cover material are compatible adhesives.

12. The aircraft insulation system of claim 7 wherein the continuous insulation blanket assembly is used in an aircraft fuselage.

13. A method of using an aircraft insulation system to provide fire penetration resistance and thermal protection, the method comprising:
   providing two or more insulation blankets comprising two or more of bay blankets and cap blankets wherein each bay blanket has a greater thickness than a thickness of each cap blanket, each insulation blanket having an inboard side and an outboard side;
   covering the outboard side of the two or more insulation blankets with a continuous fire penetration resistant cover material having a heat seal adhesive, wherein the continuous fire penetration resistant cover material is continuous between the two or more insulation blankets without any breakage;
   covering the inboard side of the two or more insulation blankets with a continuous insulation cover film having a heat seal adhesive, wherein the continuous insulation cover film is continuous between the two or more insulation blankets; and,
   joining together with a thermal heat seal the continuous fire penetration resistant cover material and the continuous insulation cover film to form a continuous insulation blanket assembly.

14. The method of claim 13 wherein the covering the outboard side further comprises covering the outboard side with the continuous fire penetration resistant cover material comprising a burnthrough paper having ceramic fiber.

15. The method of claim 13 wherein the covering the inboard side further comprises covering the inboard side with the continuous insulation cover film selected from the group consisting of polyetheretherketone (PEEK), polyetherteraphthalate (PET), polyvinylfluoride (PVF), polyetherketoneketone (PEKK), polyimide (PI), and polypropylene (PP).

16. The method of claim 13 wherein the providing the two or more insulation blankets further comprises providing two or more insulation blankets comprising two or more of bay blankets and cap blankets having fiberglass batting.

17. The method of claim 13 wherein the heat seal adhesive of the continuous fire penetration resistant cover material and the heat seal adhesive of the continuous insulation cover material are compatible adhesives.

18. The method of claim 13 further comprising using the continuous insulation blanket assembly in an aircraft fuselage.

19. A method of using an aircraft insulation system to provide fire penetration resistance and thermal protection, the method comprising:
   providing two or more insulation blankets comprising two or more of bay blankets and cap blankets wherein each bay blanket has a greater thickness than a thickness of each cap blanket, each insulation blanket having an inboard side and an outboard side;

covering the outboard side of the two or more insulation blankets with a continuous fire penetration resistant cover material having a heat seal adhesive, wherein the continuous fire penetration resistant cover material is continuous between the two or more insulation blankets without any breakage;

covering the inboard side of the two or more insulation blankets with a continuous insulation cover film having a heat seal adhesive, wherein the continuous insulation cover film is continuous between the two or more insulation blankets;

joining together with a thermal heat seal the continuous fire penetration resistant cover material and the continuous insulation cover film to form a continuous insulation blanket assembly; and, sealing with an ultrasonic heat seal or another thermal heat seal a peripheral end of each of the two or more insulation blankets.

20. The method of claim 19 wherein the covering the outboard side further comprises covering the outboard side with a continuous fire penetration resistant cover material comprising a burnthrough paper having ceramic fiber.

21. The method of claim 19 wherein the covering the inboard side further comprises covering the inboard side with a continuous insulation cover film selected from the group consisting of polyetheretherketone (PEEK), polyethertereph-thalate (PET), polyvinylfluoride (PVF), polyetherketoneke-tone (PEKK), polyimide (PI), and polypropylene (PP).

22. The method of claim 19 wherein the providing the two or more insulation blankets further comprises providing two or more insulation blankets comprising two or more of bay blankets and cap blankets having fiberglass batting.

23. The method of claim 19 wherein the heat seal adhesive of the continuous fire penetration resistant cover material and the heat seal adhesive of the continuous insulation cover material are compatible adhesives.

24. The method of claim 19 further comprising using the continuous insulation blanket assembly in an aircraft fuselage.

\* \* \* \* \*